US011484950B2

(12) United States Patent
Sun

(10) Patent No.: US 11,484,950 B2
(45) Date of Patent: Nov. 1, 2022

(54) SELF-ALIGNING DETACHABLE JAW OR FIXTURE PLATE FOR VISE-LIKE WORKHOLDING APPARATUS

(71) Applicant: Eric Sun, Huntington Beach, CA (US)

(72) Inventor: Eric Sun, Huntington Beach, CA (US)

(73) Assignee: ORANGE VISE COMPANY, LLC

( * ) Notice: Subject to any disclaimer, the term of this patent is extended or adjusted under 35 U.S.C. 154(b) by 545 days.

(21) Appl. No.: 16/549,936

(22) Filed: Aug. 23, 2019

(65) Prior Publication Data

US 2020/0130068 A1    Apr. 30, 2020

Related U.S. Application Data

(60) Provisional application No. 62/752,596, filed on Oct. 30, 2018.

(51) Int. Cl.
  *B23B 31/10*  (2006.01)
  *B23Q 3/06*  (2006.01)
  *B23B 31/103*  (2006.01)
  *B23B 31/12*  (2006.01)

(52) U.S. Cl.
  CPC .......... *B23B 31/102* (2013.01); *B23B 31/103* (2013.01); *B23B 31/12* (2013.01); *B23Q 3/06* (2013.01); *B23Q 2703/02* (2013.01)

(58) Field of Classification Search
  CPC ......... B23Q 2703/00; B25B 1/02; B25B 1/06; B25B 1/10; B25B 1/24; B25B 1/2405; B25B 1/2431; B25B 1/2436; B25B 1/2452; B25B 1/2478; B25B 5/02; B25B 5/10; B25B 5/102; B25B 5/16; B25B 5/163
  See application file for complete search history.

(56) References Cited

U.S. PATENT DOCUMENTS

| | | | | |
|---|---|---|---|---|
| 2,880,638 | A | * | 4/1959 | Muggli ................. B25B 1/2473 269/261 |
| 4,934,674 | A | * | 6/1990 | Bernstein ................ B25B 1/103 269/154 |
| 5,893,551 | A | * | 4/1999 | Cousins .................. B25B 1/103 269/154 |
| 9,289,869 | B1 | * | 3/2016 | Lelonek ................ B23Q 3/062 |

* cited by examiner

*Primary Examiner* — Tyrone V Hall, Jr.
(74) *Attorney, Agent, or Firm* — Michael M. Ahmadshahi

(57) ABSTRACT

A workholding apparatus comprises a base having a channel, two lower members each having a protrusion, and two upper members each having a cavity. Each lower member is coupled with an actuator placed inside the channel. Each upper member is removably coupled with a lower member by inserting the protrusion inside the cavity. The protrusions and the cavities include triangular regions having tilted sides. The upper members releasably engage the lower members by inserting the protrusions into the cavities. The lower members are coupled with an actuator which operates to move the lower members toward one another causing the upper members to generate a clamping, force. A mounting apparatus comprises two lower members and a single upper member, having similar protrusions and cavities, provides a mounting platform.

30 Claims, 7 Drawing Sheets

SELF-ALIGNING DETACHABLE JAW OR FIXTURE PLATE FOR VISE-LIKE WORKHOLDING APPARATUS

CROSS REFERENCE TO RELATED APPLICATIONS

The present patent application is a formalization of a previously filed provisional patent application entitled "SELF-ALIGNING DETACHABLE JAW OR FIXTURE PLATE FOR VISE-LIKE WORKHOLDING APPARATUS," filed 2018 Oct. 30, as U.S. patent application Ser. No. 62/752,596 by the inventor(s) named in this application. This patent application claims the benefit of the filing date of the cited provisional patent application according to the statutes and rules governing provisional patent applications, particularly 35 USC § 119 and 37 CFR § 1.78. The specification and drawings of the cited provisional patent application are specifically incorporated herein by reference.

COPYRIGHT

A portion of the disclosure of this patent document contains material which is subject to copyright protection. The owner has no objection to the facsimile reproduction by anyone of the patent disclosure, as it appears in the Patent and Trademark Office files or records, but otherwise reserves all copyright rights whatsoever.

FIELD OF INVENTION

The present invention, relates to a workholding, apparatus which includes lower and upper mating members having protrusions and cavities, respectively. The lower members and the upper members are mated by inserting the lower members' protrusions into the upper members' cavities. An actuator, coupled with the lower members, operates to move the lower members toward one another along an axial axis of the apparatus, thereby, providing clamping force generated by the upper members. In a related configuration, a mounting apparatus comprise a single upper member having two cavities which mate with two lower members each having a protrusion. An actuator, coupled with the lower members, operates to move the lower members toward one another along an axial axis of the apparatus, thereby, providing a mounting platform.

BACKGROUND

Workholding apparatuses, such as vises, include clamping, members which are commonly referred to as jaws. Conventional vises include jaws that are integrated, into the assembly and difficult to disassemble. Therefore, there is a need for a workholding apparatus which includes mating members which mate via protrusions and cavities and can be readily assembled and disassembled. In addition, conventional mounting apparatuses also have integrated mounting platforms which are difficult to disengage. Therefore, there is also a need for a mounting apparatus which include mating members having protrusions and cavities for easy assembly and disassembly.

SUMMARY

In one aspect, a workholding apparatus is disclosed, wherein said apparatus comprises a base comprising a width, a length, and a height, thereby defining a three-dimensional orthoaonal coordinate system having orthogonal x axis, y axis, and z axis, wherein the x axis is disposed substantially along the length and at ½ the width, wherein the y axis is disposed substantially along the width and at ½ the length, and wherein the z axis is disposed substantially along the height and at the intersection of the x axis and they axis, said base comprising a channel, along the x axis, a first lower member comprising a first protrusion wherein the first protrusion comprises a first-lower-member planar top surface whose normal vector is substantially parallel to the z axis, said first-lower-member planar top surface comprising a substantially triangular first-lower-member region having two first-lower-member edges oriented substantially symmetrically at an edge angle with respect to the x axis, and two first-lower-member planar side surfaces along the two first-lower-member edges tilted inwardly by a tilt angle with respect to the z axis, a second lower member comprising a second protrusion wherein the second protrusion comprises a second-lower-member planar top surface whose normal vector is substantially parallel to the z axis, said second-lower-member planar top surface comprising a substantially triangular second-lower-member region having two second-lower-member edges oriented substantially symmetrically at the edge angle with respect to the x axis, and two second-lower-member planar side surfaces along the two second-lower-member edges tilted inwardly by the tilt angle with respect to the z axis, a first upper member comprising a first cavity wherein the first cavity comprises a first-upper-member planar bottom surface whose normal vector is substantially parallel to the z axis, said first-upper-member planar bottom surface comprising a substantially triangular first-upper-member region having two first-upper-member edges oriented substantially symmetrically at the edge angle with respect to the x axis, and two first-upper-member planar side surfaces along the two first-upper-member edges tilted inwardly by the tilt angle with respect to the z axis, a second upper member comprising a second cavity wherein the second cavity comprises a second-upper-member planar bottom surface whose normal vector is substantially parallel to the z axis, said second-upper-member planar bottom surface comprising a substantially triangular second-upper-member region having two second-upper-member edges oriented substantially symmetrically at the edge angle with respect to the x axis, and two second-upper-member planar side surfaces along the two second-upper-member edges tilted inwardly by the tilt angle with respect to the z axis, and an actuator disposed slidably removably within the channel and coupled with the first lower member and the second lower member, wherein the first upper member releasably engages the first lower member by inserting the first protrusion in the first cavity, wherein the second upper member releasably engages the second lower member by inserting the second protrusion in the second cavity, and wherein the actuator is configured to move the second lower member toward the first lower member along the x axis.

Preferably, the width is equal to 4.0 inches, the length is equal to 5.9 inches, and the height is equal to 1.9 inches.

Preferably, the edge angle is equal to 45 degrees.

Preferably, the tilt angle is equal to 30 degrees.

Preferably, the first-lower-member planar top surface further comprises a substantially rectangular first-lower-member region and a substantially circular first-lower-member region, and wherein the first-upper-member planar bottom surface further comprises a substantially rectangular first-upper-member region and three substantially circular first-upper-member regions.

Preferably, the second-lower-member planar top surface further comprises a substantially rectangular second-lower-member region and a substantially circular second-lower-member region, and wherein the second-upper-member planar bottom surface further comprises a substantially rectangular second-upper-member region and three substantially circular second-upper-member regions.

Preferably, the first upper member further comprises a first-upper-member threaded hole along the x axis configured to receive a first-upper-member retaining screw operative to insert the first cavity and engage the first protrusion.

Preferably, the second upper member further comprises a second-upper-member threaded hole along the x axis configured to receive a second-upper-member retaining screw operative to insert the second cavity and engage the second protrusion.

Preferably, the actuator is a bolt having a shank section and a threaded section.

Preferably, the first lower member further comprises a clearance hole and the second lower member further comprises a threaded hole, and wherein the bolt is coupled with the first lower member and the second lower member via the clearance hole and the threaded hole, respectively.

Preferably, the actuator is a bolt having a clockwise threaded section and a counter-clockwise threaded section.

Preferably, the first lower member further comprises a clockwise threaded hole and the second lower member further comprises a counter-clockwise threaded hole, and wherein the bolt is coupled with the first lower member and the second lower member via the clockwise threaded hole and the counter-clockwise threaded hole, respectively.

In another aspect, a removable jaw assembly for a workholding apparatus is disclosed wherein said workholding apparatus comprises a base comprising a width, a length, and a height, thereby defining a three-dimensional orthogonal coordinate system having orthogonal x axis, y axis, and z axis, wherein the x axis is disposed substantially along the length and at ½ the width, wherein the y axis is disposed substantially along the width and at ½ the length, and wherein the z axis is disposed substantially along the height and at the intersection of the x axis and the y axis, said base comprising a channel along the x axis, said removable jaw assembly comprising a first lower member comprising a first protrusion wherein the first protrusion comprises a first-lower-member planar top surface whose normal vector is substantially parallel to the z axis, said first-lower-member planar top surface comprising a substantially triangular first-lower-member region having two first-lower-member edges oriented substantially symmetrically at an edge angle with respect to the x axis, and two first-lower-member planar side surfaces along the two first-lower-member edges tilted inwardly by a tilt angle with respect to the z axis, a second lower member comprising a second protrusion wherein the second protrusion comprises a second-lower-member planar top surface whose normal vector is substantially parallel to the z axis, said second-lower-member planar top surface comprising a substantially triangular second-lower-member region having two second-lower-member edges oriented substantially symmetrically at the edge angle with respect to the x axis, and two second-lower-member planar side surfaces along the two second-lower-member edges tilted inwardly by the tilt angle with respect to the z axis, a first upper member comprising a first cavity wherein the first cavity comprises a first-upper-member planar bottom surface whose normal vector is substantially parallel to the z axis, said first-upper-member planar bottom surface comprising a substantially triangular first-upper-member region having two first-upper-member edges oriented substantially symmetrically at the edge angle with respect to the x axis, and two first-upper-member planar side surfaces along the two first-upper-member edges tilted inwardly by the tilt angle with respect to the z axis, a second upper member comprising a second cavity wherein the second cavity comprises a second-upper-member planar bottom surface whose normal vector is substantially parallel to the z axis, said second-upper-member planar bottom surface comprising a substantially triangular second-upper-member region having two second-upper-member edges oriented substantially symmetrically at the edge angle with respect to the x axis, and two second-upper-member planar side surfaces along the two second-upper-member edges tilted inwardly by the tilt angle with respect to the z axis, and an actuator disposed slidably removably within the channel and coupled with the first lower member and the second lower member, wherein the first upper member releasably engages the first lower member by inserting the first protrusion in the first cavity, wherein the second upper member releasably engages the second lower member by inserting the second protrusion in the second cavity, and wherein the actuator is configured to move the second lower member toward the first lower member along the x axis.

Preferably, the width is equal to 4.0 inches, the length is equal to 5.9 inches, and the height is equal to 1.9 inches.

Preferably, the edge angle is equal to 45 degrees.

Preferably, the tilt angle is equal to 30 degrees.

Preferably, the first-lower-member planar top surface further comprises a substantially rectangular first-lower-member region and a substantially circular first-lower-member region, and wherein the first-upper-member planar bottom surface further comprises a substantially rectangular first-upper-member region and three substantially circular first-upper-member regions.

Preferably, the second-lower-member planar top surface further comprises a substantially rectangular second-lower-member region and a substantially circular second-lower-member region, and wherein the second-upper-member planar bottom surface further comprises a substantially rectangular second-upper-member region and three substantially circular second-upper-member regions.

Preferably, the first upper member further comprises a first-upper-member threaded hole along the x axis configured to receive a first-upper-member retaining screw operative to insert the first cavity and engage the first protrusion.

Preferably, the second upper member further comprises a second-upper-member threaded hole along the x axis configured to receive a second-upper-member retaining screw operative to insert the second cavity and engage the second protrusion.

Preferably, the actuator is a bolt having a shank section and a threaded section.

Preferably, the first lower member further comprises a clearance hole and the second lower member further comprises a threaded hole, and wherein the bolt is coupled with the first lower member and the second lower member via the clearance hole and the threaded hole, respectively.

Preferably, the actuator is a bolt having a clockwise threaded section and a counter-clockwise threaded section.

Preferably, the first lower member further comprises a clockwise threaded hole and the second lower member further comprises a counter-clockwise threaded hole, and wherein the bolt is coupled with the first lower member and the second lower member via the clockwise threaded hole and the counter-clockwise threaded hole, respectively.

In another aspect, a mounting apparatus is disclosed wherein said apparatus comprises a base comprising a width, a length, and a height, thereby defining a three-dimensional orthogonal coordinate system having orthogonal x axis, y axis, and z axis, wherein the x axis is disposed substantially along the length and at ½ the width, wherein the y axis is disposed substantially along the width and at 112 the length, and wherein the z axis is disposed substantially along the height and at the intersection of the x axis and the y axis, said base comprising a channel along the x axis, a first lower member comprising a first protrusion wherein the first protrusion comprises a first-lower-member planar top surface whose normal vector is substantially parallel to the z axis, said first-lower-member planar top surface comprising a substantially triangular first-lower-member region having two first-lower-member edges oriented substantially symmetrically at an edge angle with respect to the x axis, and two first-lower-member planar side surfaces along the two first-lower-member edges tilted inwardly by a tilt angle with respect to the z axis, a second lower member comprising a second protrusion wherein the second protrusion comprises a second-lower-member planar top surface whose normal vector is substantially parallel to the z axis, said second-lower-member planar top surface comprising a substantially triangular second-lower-member region having two second-lower-member edges oriented substantially symmetrically at the edge angle with respect to the x axis, and two second-lower-member planar side surfaces along the two second-lower-member edges tilted inwardly by the tilt angle with respect to the z axis, an upper member comprising a first distal-end cavity and a second distal-end cavity, wherein the first distal-end cavity comprises a first-upper-member planar bottom surface whose normal vector is substantially parallel to the z axis, said first-upper-member planar bottom surface comprising a substantially triangular first-upper-member region having two first-upper-member edges oriented substantially symmetrically at the edge angle with respect to the x axis, and two first-upper-member planar side surfaces along the two first-upper-member edges tilted inwardly by the tilt angle with respect to the z axis, wherein the second distal-end cavity comprises a second-upper-member planar bottom surface whose normal vector is substantially parallel to the z axis, said second-upper-member planar bottom surface comprising a substantially triangular second-upper-member region having two second-upper-member edges oriented substantially symmetrically at the edge angle with respect to the x axis, and two second-upper-member planar side surfaces along the two second-upper-member edges tilted inwardly by the tilt angle with respect to the z axis, and an actuator disposed slidably removably within the channel and coupled with the first lower member and the second lower member, wherein the upper member releasably engages the first lower member by inserting the first protrusion in the first distal-end cavity, wherein the upper member releasably engages the second lower member by inserting the second protrusion in the second distal-end cavity, and wherein the actuator is configured to move the second lower member toward the first lower member along the x axis.

Preferably, the edge angle is equal to 45 degrees.

Preferably, the tilt angle is equal to 30 degrees.

Preferably, the first-lower-member planar top surface further comprises a substantially rectangular first-lower-member region and a substantially circular first-lower-member region, and wherein the first-upper-member planar bottom surface further comprises a substantially rectangular first-upper-member region and three substantially circular first-upper-member regions.

Preferably, the second-lower-member planar top surface further comprises a substantially rectangular second-lower-member region and a substantially circular second-lower-member region, and wherein the second-upper-member planar bottom surface further comprises a substantially rectangular second-upper-member region and three substantially circular second-upper-member regions.

In another aspect, a mounting apparatus is disclosed wherein said apparatus comprises a base comprising a width, a length, and a height, thereby defining a three-dimensional orthogonal coordinate system having orthogonal x axis, y axis, and z axis, wherein the x axis is disposed substantially along the length and at ½ the width, wherein the y axis is disposed substantially along the width and at ½ the length, and wherein the z axis is disposed substantially along the height and at the intersection of the x axis and the y axis, said base comprising a channel and a plurality of threaded index holes along the x axis, a first lower member, coupled with the base via two of the plurality of threaded index holes, said first lower member comprising a first protrusion wherein the first protrusion comprises a first-lower-member planar top surface whose normal vector is substantially parallel to the z axis, said first-lower-member planar top surface comprising a substantially triangular first-lower-member region having two first-lower-member edges oriented substantially symmetrically at an edge angle with respect to the x axis, and two first-lower-member planar side surfaces along the two first-lower-member edges tilted inwardly by a tilt angle with respect to the z axis, a second lower member, coupled with the base via another two of the plurality of threaded index holes, said second lower member comprising a second protrusion wherein the second protrusion comprises a second-lower-member planar top surface whose normal vector is substantially parallel to the z axis, said second-lower-member planar top surface comprising a substantially triangular second-lower-member region having two second-lower-member edges oriented substantially symmetrically at the edge angle with respect to the x axis, and two second-lower-member planar side surfaces along the two second-lower-member edges tilted inwardly by the tilt angle with respect to the z axis, and an upper member comprising a first distal-end cavity and a second distal-end cavity, wherein the first distal-end cavity comprises a first-upper-member planar bottom surface whose normal vector is substantially parallel to the z axis, said first-upper-member planar bottom surface comprising a substantially triangular first-upper-member region having two first-upper-member edges oriented substantially symmetrically at the edge angle with respect to the x axis, and two first-upper-member planar side surfaces along the two first-upper-member edges tilted inwardly by the tilt angle with respect to the z axis, wherein the second distal-end cavity comprises a second-upper-member planar bottom surface whose normal vector is substantially parallel to the z axis, said second-upper-member planar bottom surface comprising a substantially triangular second-upper-member region having two second-upper-member edges oriented substantially symmetrically at the edge angle with respect to the x axis, and two second-upper-member planar side surfaces along the two second-upper-member edges tilted inwardly by the tilt angle with respect to the z axis, wherein the upper member releasably engages the first lower member by inserting the first protrusion in the first distal-end cavity, and wherein the upper member releasably engages the second lower member by inserting the second protrusion in the second distal-end cavity.

Preferably, the edge angle is equal to 45 degrees.
Preferably, the tilt angle is equal to 30 degrees.
Preferably, the first-lower-member planar top surface further comprises a substantially rectangular first-lower-member region and a substantially circular first-lower-member region, and wherein the first-upper-member planar bottom surface further comprises a substantially rectangular first-upper-member region and three substantially circular first-upper-member regions.

Preferably, the second-lower-member planar top surface further comprises a substantially rectangular second-lower-member region and a substantially circular second-lower-member region, and wherein the second-upper-member planar bottom surface further comprises a substantially rectangular second-upper-member region and three substantially circular second-upper-member regions.

DETAILED DESCRIPTION OF THE PRESENTLY PREFERRED EMBODIMENTS

Figure 1:
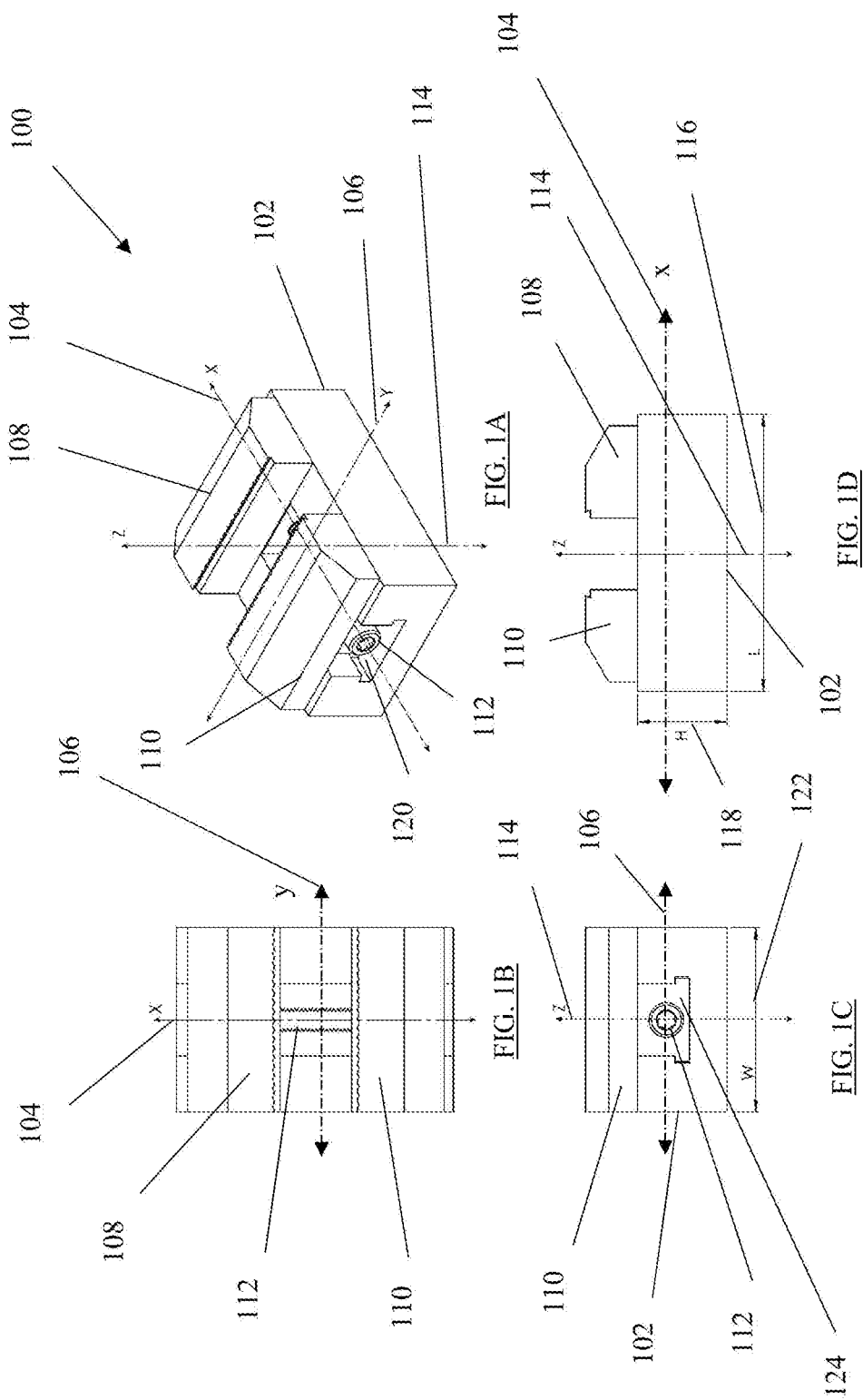
FIG. 1A shows a perspective view of a workholding apparatus according to a preferred embodiment of the present invention.
FIG. 1B shows a top view of the workholding apparatus shown in FIG. 1A.
FIG. 1C shows a front view of the workholding apparatus shown in FIG. 1A.
FIG. 1D shows a side view of the workholding apparatus, shown in FIG. 1A.

FIG. 1A depicts a perspective view of a workholding apparatus 100 having a base 102, afirst upper member 110, a second upper member 108, a first lower member (not visible in this view) engaged with the first upper member 110, a second lower member (not visible in this view) engaged with the second upper member 108, and an actuator 112, coupled with the first lower member and the second lower member, and configured to move the second lower member toward the first, lower member. The base 102 comprises a width 122 (see FIG. 1C), a length 116 (see FIG. 1D), and a height 118 (see FIG. 1D), thereby defining a three-dimensional orthogonal coordinate system having orthogonal x axis 104, y axis 106, and z axis 114, wherein the x axis 104 is disposed substantially along the length 116 and at ½ the width 122 (see FIG. 1C), wherein the y axis 106 is disposed substantially along the width 122 and at 112 the length 116 (see FIG. 1D), and wherein the z axis 114 is disposed substantially along the height 118 (see FIG. 1D) and at the intersection of the x axis 104 and, the y axis 106.

As known to artisans of ordinary skill, the three-dimensional orthogonal coordinate system may be disposed anywhere in space. In one preferred embodiment, the origin of the three-dimensional orthogonal coordinate system is disposed at ¾ of the height 118. The base 102 includes a channel 120 along the x axis 104. The actuator 112 is disposed within the channel 120 so as to enable the jaw assembly which is comprised of the first lower member, second lower member, first upper member 110, the second upper member 108, and the actuator 112 to slide and be readily removed from the base 102. In a preferred embodiment, the actuator 112 is a bolt having a shank section and a threaded section which are used to couple the first lower member and the second lower member to the actuator 112.

FIG. 1B depicts a top view of the workholding apparatus 100 shown in FIG. 1A further illustrating the first upper member 110, the second upper member 108, and the actuator 112. An object (not shown) can be placed and held between the first upper member 110 and the second upper member 108 as the actuator operates to move the second lower member toward the first lower member which are engaged with the second upper member 108 and the first upper member 110, respectively.

FIG. 1C depicts a front view of the workholding apparatus 100 shown in FIG. 1A further illustrating the first lower member 124 that is visible in this view. The first lower member 124 has engaged the first upper member 110 and as the bolt 112 is rotated, the second lower member, which has engaged the second upper member 108, moves toward the first lower member 124 thereby exerting a gripping force on the sides of the object. In this figure, the base 102 is shown to have the width 122. In a preferred embodiment, the width 122 is equal to 4.0 inches.

FIG. 1D depicts a side view of the workholding apparatus 100 shown in FIG. 1A further illustrating the first upper member 110 and the second upper member 108 along the x axis 104. As stated above, the first lower member 124 and the second lower member (not shown in this view) move along the x axis 104 when the actuator 112 mover the second lower member toward the first lower member 124. In, this figure, the base 102 is shown to have the height 118 and the length 116. In a preferred embodiment, the height 118 is equal to 1.9 inches and the length 116 is equal to 5.9 inches.

Figure 2:
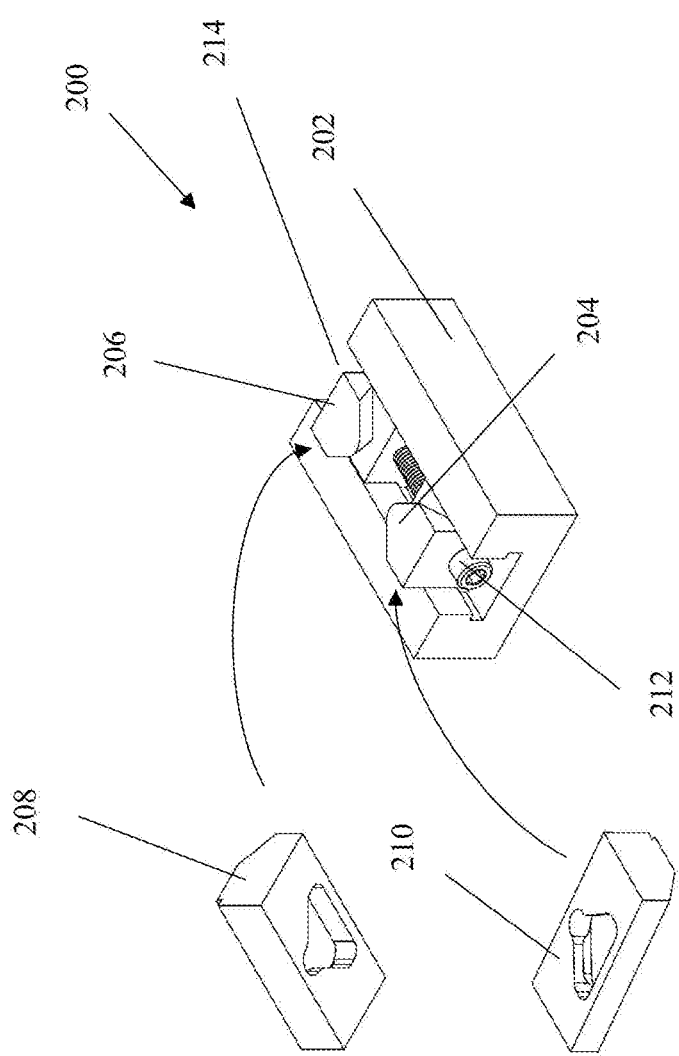
FIG. 2 shows an exploded view of a workholding apparatus illustrating two lower members coupled with an actuator within a channel of a base of the workholding apparatus where two upper members engage the two lower members which, are actuated so as to hold an object via the two upper members according to a preferred embodiment of the present invention.

FIG. 2 depicts an exploded view of a workholding apparatus 200 showing its components according to a preferred embodiment. Specifically, the workholding apparatus comprises a base 202, a first lower member 204, a second lower member 206, a first upper member 210, a second upper member 208, and an actuator 212. The base further includes a channel 214. The first lower member 204 includes a first protrusion which is shown and discussed more fully in relation with FIGS. 3A, 3B, and 3C. The first upper member 210 includes a first cavity which is shown and discussed more fully in relation with FIGS. 4A, 4B, and 4C. The first upper member 210 releasably engages the first lower member 204 by inserting the first protrusion in the first cavity. Similarly, the second lower member 206 includes a second protrusion and the second upper member 208 includes a second cavity wherein the second upper member 208 releasably engages the second lower member 206 by inserting the second protrusion in the second cavity. The shape of the first and second protrusions and the first and second cavities ensure a stable engagement between the first and second upper members 210 and 208 and the first and second lower members 204 and 206 even at exceedingly high gripping force as the actuator 212 moves the second lower member 206 toward the first lower member 204.

Figure 3:
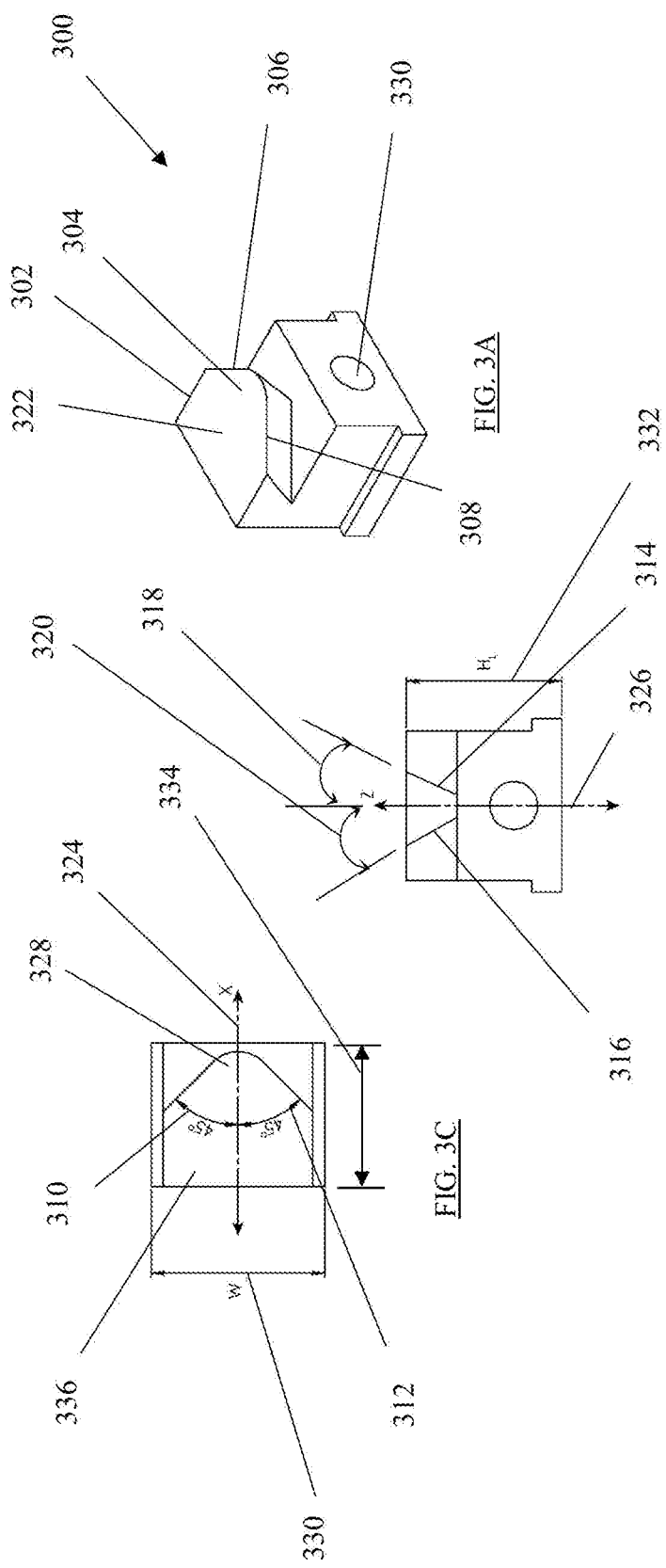
FIG. 3A shows a perspective view of a lower member of a workholding apparatus according to a preferred embodiment of the present invention.
FIG. 3B shows a front view of the lower member shown in FIG. 3A.
FIG. 3C shows a top view of the lower member shown in FIG. 3A.

FIG. 3A depicts a perspective view of a lower member 300 of a workholding apparatus such as the workholding apparatus 200 shown in FIG. 2 according to a preferred embodiment. Although the first and second lower members are interchangeable, for illustrative purposes, the lower member 300 is taken to be a first lower member 300. FIGS. 3B and 3C show a front and a top views of the first lower member 300 and are referred to along with FIG. 3A to clearly define its geometry. In these figures, the first lower member 300 is shown to comprise a first protrusion 302. The first protrusion 302 comprises a first-lower-member planar top surface 322 whose normal vector is substantially parallel to a z axis 326. The first-lower-member planar top surface 322 further comprises a substantially triangular first-lower-member region 304 which comprises two first-lower-member edges 306 and 308. In a preferred embodiment, the two first-lower-member edges 306 and 308 are oriented substantially symmetrically at an edge angle 310 or 312 with respect to are x axis 324. In particular, the edge 306 makes the edge angle 310 with respect to the x axis 324 and the edge 308 makes the edge angle 312 with respect to the x axis 324. Although, the edges 306 and 308 are oriented substantially symmetrically about the x axis 324, non-symmetrically oriented edges are contemplated and within the scope of the present invention. The first protrusion 302 further comprises two first-lower-member planar side surfaces 314 and 316 along the two first-lower-member edges 306 and 308. The two first-lower-member planar side surfaces 314 and 316 are tilted inwardly by a tilt angle 318 or 320 with respect to the z axis 326. In a preferred embodiment, the edge angle 310 or 312 is equal to 45 degrees as shown in FIG. 3C, and the tilt angle 318 or 320 is equal to 30 degrees. In a preferred embodiment, the first-lower-member planar top surface 322 further comprises a substantially rectangular first-lower-member region 336 and a substantially circular first-lower-member region 328. In a preferred embodiment, the first lower member 300 further comprises a clearance hole 330 which is used to couple the first lower member 300 with an actuator such as a bolt.

Figure 4:
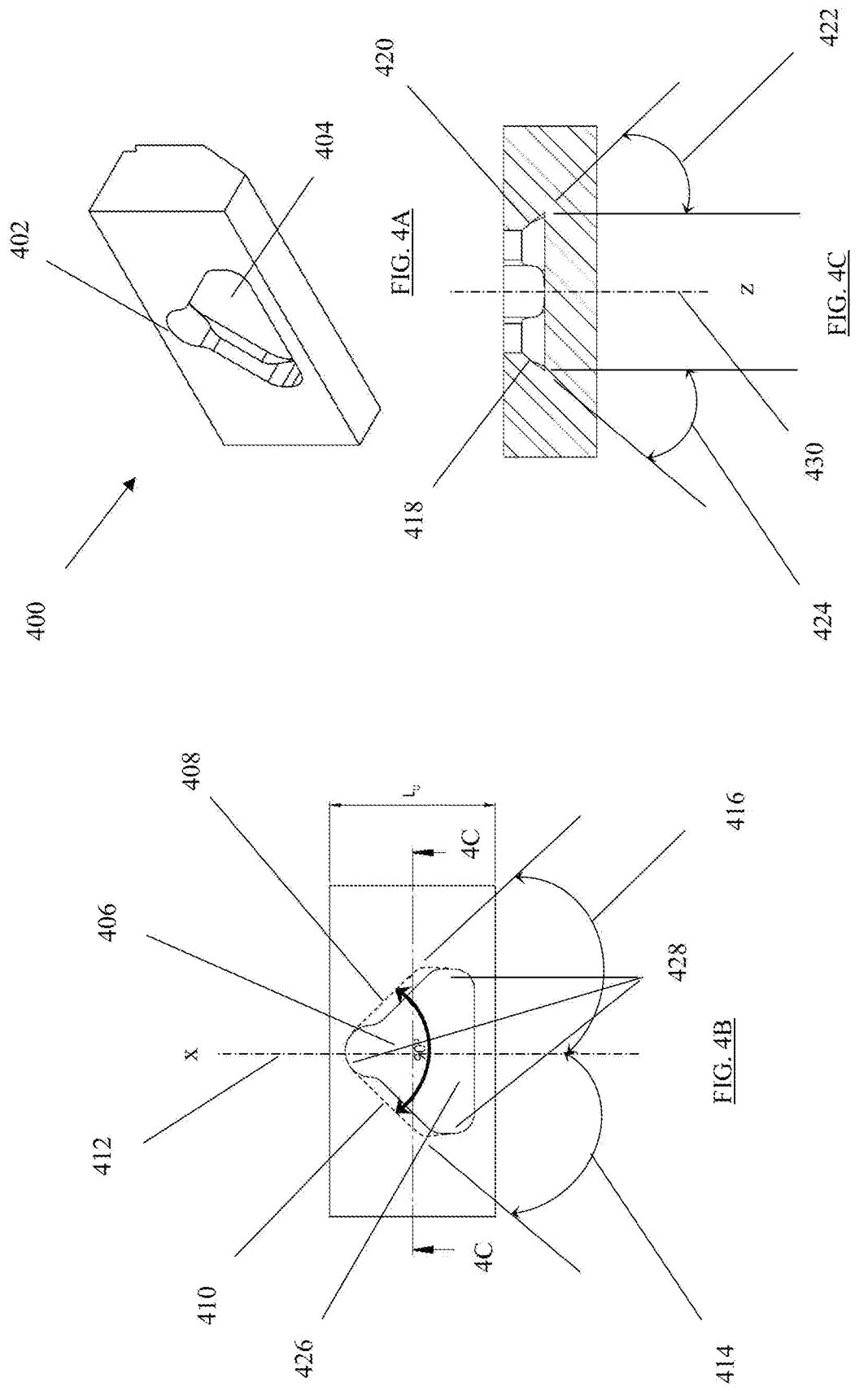
FIG. 4A shows a perspective view of an upper member of a workholding apparatus according to a preferred embodiment of the present invention.
FIG. 4B shows a bottom view of the upper member shown in FIG. 4A.
FIG. 4C shows a cross-sectional view of the upper member shown in FIG. 4B.

FIG. 4A depicts a perspective vie of an upper member 400 of a workholding apparatus such as the workholding apparatus 200 shown in FIG. 2 according to a preferred embodiment. Although the first and second upper members are interchangeable, for illustrative purposes, the upper member 400 is taken to be a second upper member 400. FIGS. 4B and 4C show a bottom and a cross-sectional views of the second upper member 400 and are referred to along with FIG. 4A to clearly define its geometry. In these figures, the second upper member 400 is shown to comprise a second cavity 402. The second cavity 402 comprises a second-upper-member planar bottom surface 404 whose normal vector is substantially parallel to a z axis 430. The second-upper-member planar bottom surface 404 further comprises a substantially triangular second-upper-member region 406 which comprises two second-upper-member edges 408 and 410. In a preferred embodiment, the two second-upper-member edges 408 and 410 are oriented substantially symmetrically at an edge angle 414 or 416 with respect to an x axis 412. In particular, the edge 408 makes the edge angle 416 with respect to the x axis 412 and the edge 410 makes the edge angle 414 with respect to the x axis 412. Although, the edges 408 and 410 are oriented substantially symmetrically about the x axis 412, non-symmetrically oriented edges are contemplated and within the scope of the present invention. The second cavity 402 further comprises two second-upper-member planar side surfaces 420 and 418 along the two second-upper-member edges 408 and 410. The two second-upper-member planar side surfaces 420 and 418 are tilted inwardly by a tilt angle 422 or 424 with respect to the z axis 430. In a preferred embodiment, the edge angle 414 or 416 is equal to 45 degrees as shown in FIG. 4B, and the tilt angle 422 or 424 is equal to 30 degrees. In a preferred embodiment, the second-upper-member planar bottom surface 404 further comprises a substantially rectangular second-upper-member region 426 and three substantially circular second-upper-member regions 428. In a preferred embodiment, the second upper member 400 further comprises a second-upper-member threaded hole (not shown) along the x axis 412 configured to receive a second-upper-member retaining screw operative to insert the second cavity 402 and engage a second protrusion.

Figure 5:
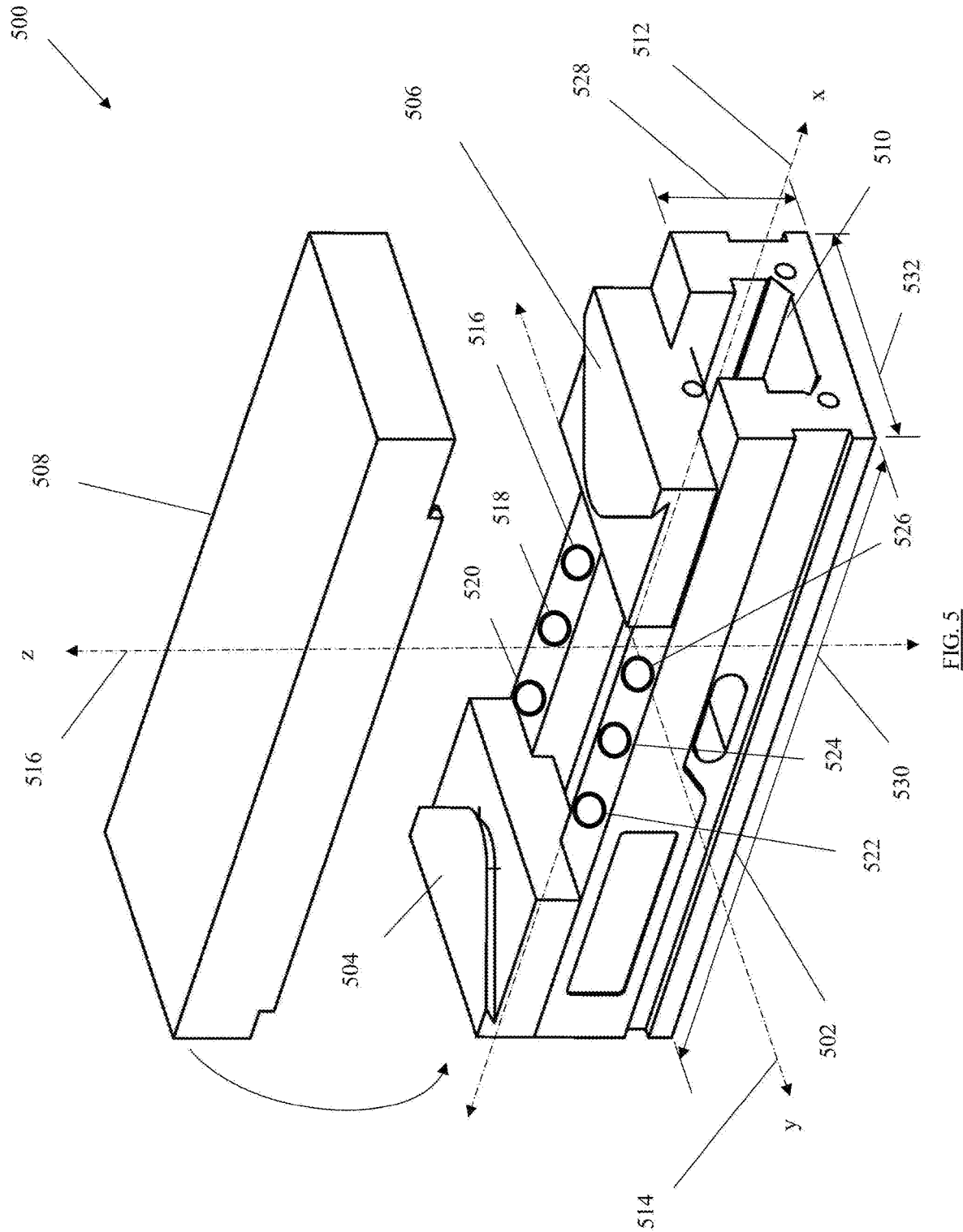
FIG. 5 shows an exploded view of a mounting apparatus illustrating two lower members coupled with a base via two of a plurality of threaded index holes of the base and an upper member which engages the two lower members so as to provide a working platform according to a preferred embodiment of the present invention.

FIG. 5 depicts an exploded view of a mounting apparatus 500 showing its components according to a preferred embodiment. Specifically, the mounting apparatus 500 comprises a base 502, a first lower member 504, a second lower member 506, and an upper member 508. The base 502 comprises a width 532, a length 530, and a height 528, thereby defining a three-dimensional orthogonal coordinate system having orthogonal x axis 512, y axis 514, and z axis 516, wherein the x axis 512 is disposed substantially along the length 530 and at ½ the width 532, wherein the y axis 514 is disposed substantially along the width 532 and at ½ the length 530, and wherein the z axis 516 is disposed substantially along the height 528 and at the intersection of the x axis 512 and the y axis 514. The base 502 further includes a channel 510 and a plurality of threaded index holes 516, 518, 520, 522, 524, and 526 along the x axis 512. In one preferred embodiment, the index holes 516, 518, 520, 522, 524, and 526 are not threaded a dwell pin may be used to secure the first lower member 504 and the second lower member 506 to the base 502. The first lower member 504 includes a first protrusion, which is shown and discussed more fully in relation with FIGS. 6A and 6B. Similarly, the second lower member 506 includes a second protrusion. An upper member 508 includes a first distal-end cavity and a second distal-end cavity which are shown and discussed more fully in relation with FIGS. 7A, 7B, and 7C. The upper member 508 releasably engages the first lower member 504 and the second lower member 506 by inserting the first protrusion in the first distal-end cavity and the second protrusion in the second distal-end cavity. The shape of the first and second protrusions and the first and second distal-end cavities ensure a stable engagement between the upper member 508 and the first and second lower members 504 and 506 even at exceedingly high loads on the top surface of the upper member 508.

Figure 6A:
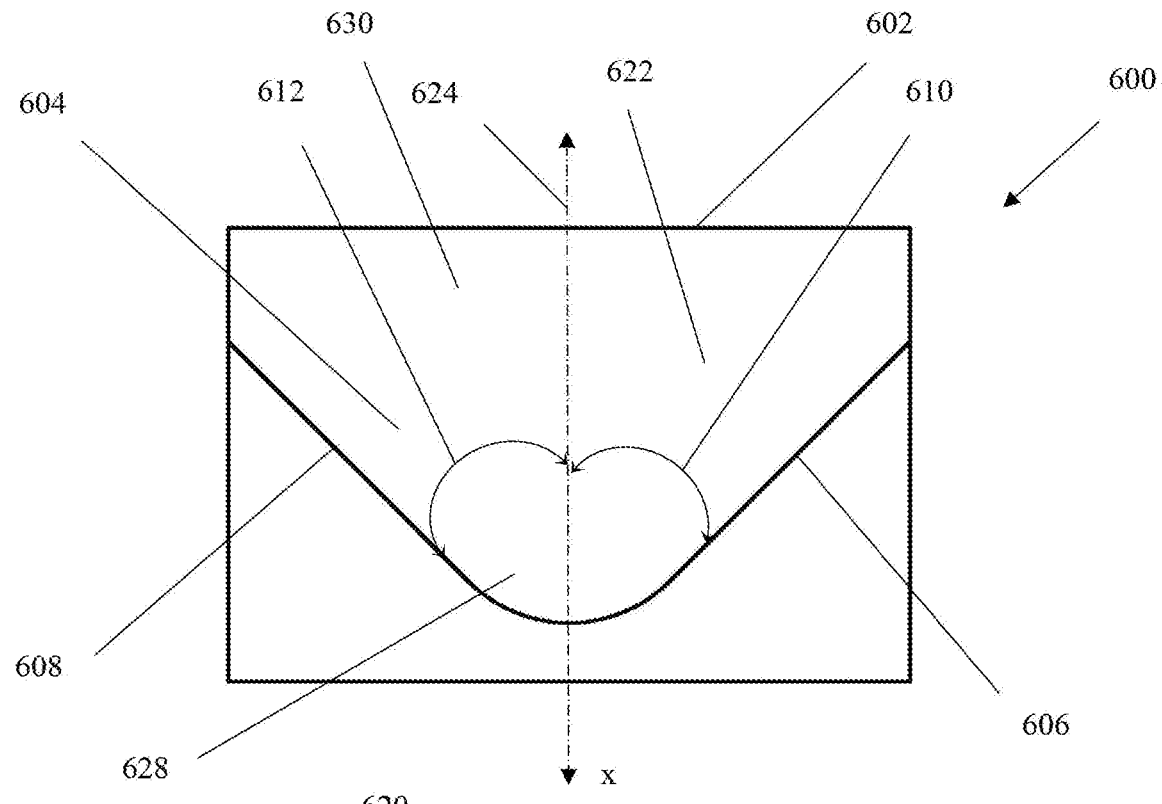
FIG. 6A shows a top view of a lower member of a mounting apparatus according to a preferred embodiment of the present invention.
Figure 6B:
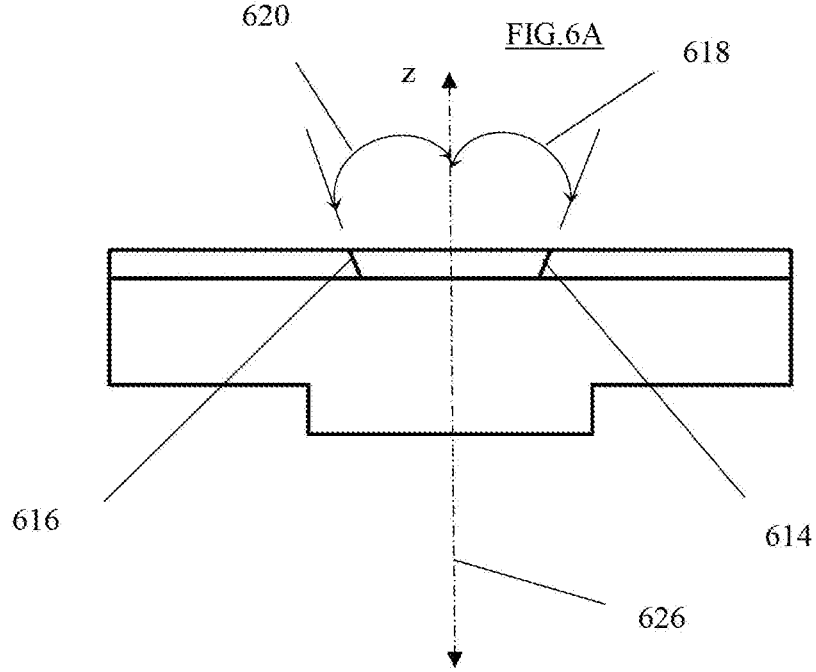
FIG. 6B shows a front view of the lower member shown in FIG. 6A.

FIG. 6A depicts a top view of a lower member 600 of a mounting apparatus such as the mounting apparatus 500 shown in FIG. 5 according to a preferred embodiment. Although the first and second lower members are interchangeable, for illustrative purposes, the lower member 500 is taken to be a first lower member 500. FIG. 6B shows a front view of the first lower member 600 and is referred to along with FIG. 6A to clearly define its geometry. In these figures, the first lower member 600 is shown to comprise a first protrusion 602. The first protrusion 602 comprises a first-lower-member planar top surface 622 whose normal vector is substantially parallel to a z axis 626. The first-lower-member planar top surface 622 further comprises a substantially triangular first-lower-member region 604 which comprises two first-lower-member edges 606 and 608. In a preferred embodiment, the two first-lower-member edges 606 and 608 are oriented substantially symmetrically at an edge angle 610 or 612 with respect to an x axis 624. In particular, the edge 606 makes the edge angle 610 with respect to the x axis 624 and the edge 608 makes the edge angle 612 with respect to the x axis 624. Although, the edges 606 and 608 are oriented substantially symmetrically about the x axis 624, non-symmetrically oriented edges are contemplated and within the scope of the present invention. The first protrusion 602 further comprises two first-lower-member planar side surfaces 614 and 616 along the two first-lower-member edges 606 and 608. The two first-lower-member planar side surfaces 614 and 616 are tilted inwardly by a tilt angle 618 or 620 with respect to the z axis 626. In a preferred embodiment, the edge angle 610 or 612 is equal to 45 degrees, and the tilt angle 618 or 620 is equal to 30 degrees. In a preferred embodiment, the first-lower-member planar top surface 622 further comprises a substantially rectangular first-lower-member region 630 and a substantially circular first-lower-member region 628.

Figure 7A:
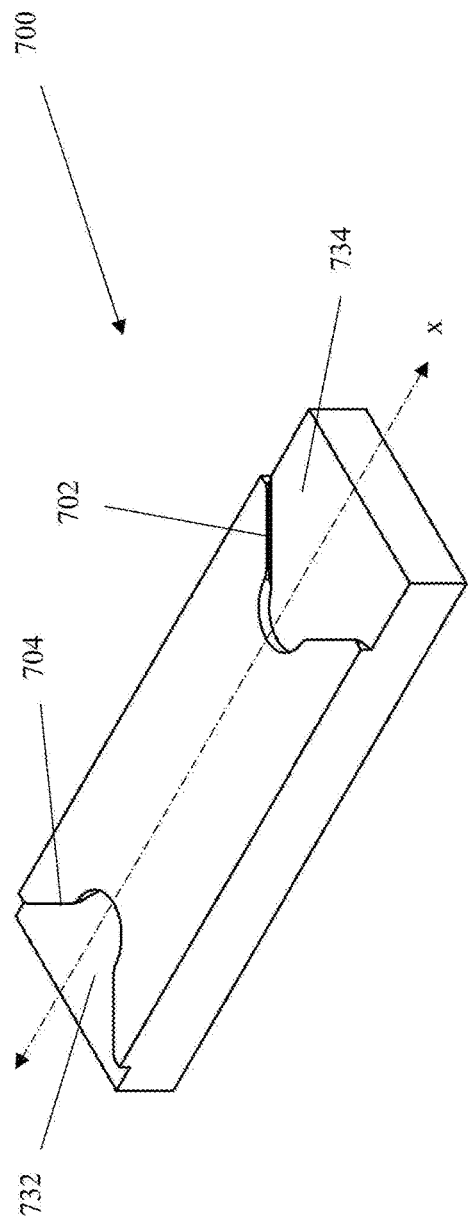
FIG. 7A shows a perspective view of an upper member of a mounting apparatus according to a preferred embodiment of the present invention.
Figure 7C:
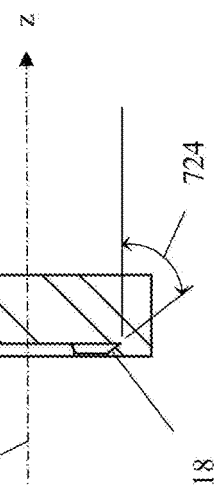
FIG. 7C shows a cross-sectional view of the upper member shown in FIG. 7B.
Figure 7B:
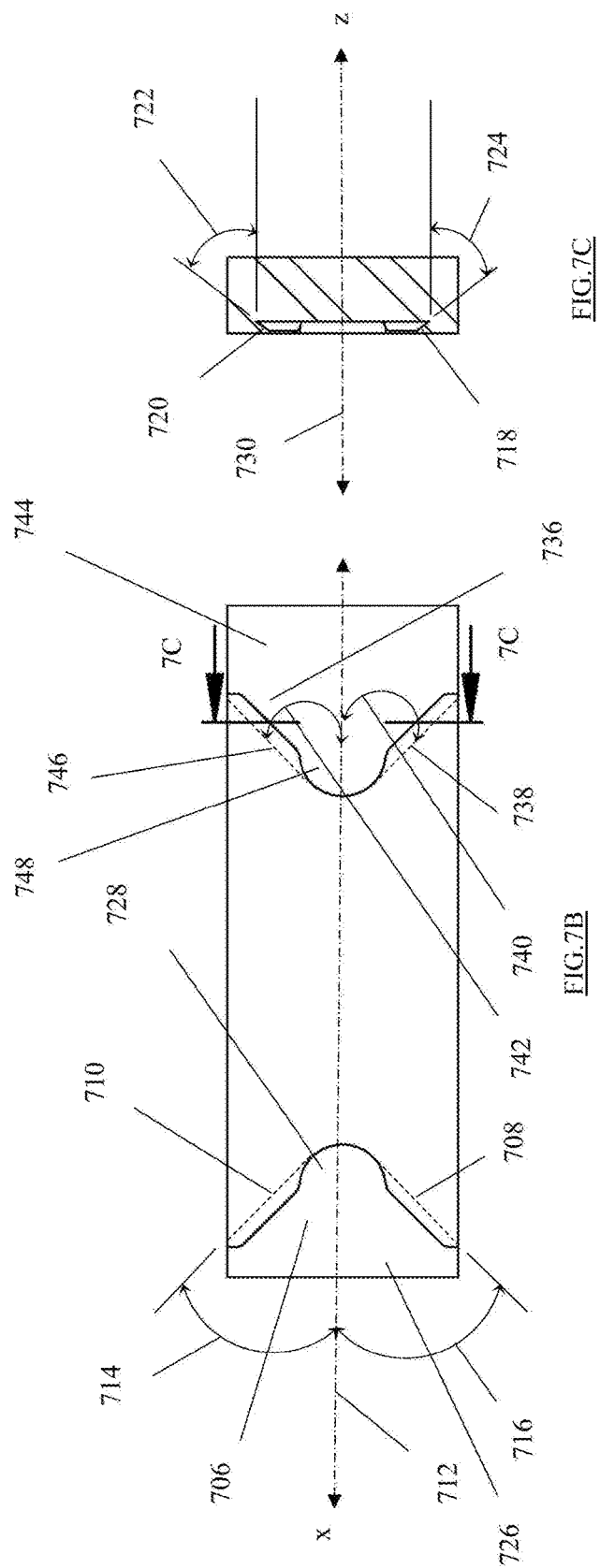
FIG. 7B shows a bottom view of the upper member shown in FIG. 7A.

FIG. 7A depicts a perspective view of an upper member 700 of a mounting, apparatus such as the mounting apparatus 500 shown in FIG. 5 according to a preferred embodiment. FIGS. 7B and 7C show a bottom and a cross-sectional views of the upper member 700 and are referred to along with FIG. 7A to clearly define its geometry. In these figures, the upper member 700 is shown to comprise a first distal end cavity 704 and a second distal-end cavity 702. The first distal-end cavity 704 comprises a first-upper-member planar bottom surface 732 whose normal, vector is substantially parallel to a z axis 730. The second distal-end cavity 702 comprises a second-upper-member planar bottom surface 732 whose normal vector is substantially parallel to the z axis 730.

The first-upper-member planar bottom surface 732 further comprises a substantially triangular first-upper-member region 706 which comprises two first-upper-member edges 708 and 710. In a preferred embodiment, the two first-upper-member edges 708 and 710 are oriented substantially symmetrically at an edge angle 714 or 716 with respect to an x axis 712. In particular, the edge 708 makes the edge angle 716 with respect to the x axis 712 and the edge 710 makes the edge angle 714 with respect to the x axis 712. Although, the edges 708 and 710 are oriented substantially symmetrically about the x axis 712, non-symmetrically oriented edges are contemplated and within the scope of the present invention.

The second-upper-member planar bottom surface 734 further comprises a substantially triangular second-upper-member region 736 which comprises two second-upper-member edges 738 and 746. In a preferred embodiment, the two second-upper-member edges 738 and 746 are oriented substantially symmetrically at an edge angle 740 or 742 with respect to the x axis 712. In particular, the edge 738 makes the edge angle 740 with respect to the x axis 712 and the edge 746 makes the edge angle 742 with respect to the x axis 712. Although, the edges 738 and 746 are oriented substantially symmetrically about the x axis 712, non-symmetrically oriented edges are contemplated and within the scope of the present invention.

The first distal-end cavity 704 further comprises two first-upper-member planar side surfaces (not visible in this view) along the two first-upper-member edges 708 and 710 tilted inwardly by the tilt angle (not visible in this view) with respect to the z axis 730. The second distal-end cavity further comprises two second-upper-member planar side surfaces 718 and 720 along the two second-upper-member edges 738 and 746 tilted inwardly by a tilt angle 722 or 724 with respect to the z axis 730. In a preferred embodiment, the edge angle 714 or 716 is equal to 45 degrees, and the tilt angle 722 or 724 is equal to 30 degrees. In a preferred embodiment, the first-upper-member planar bottom surface 732 further comprises a substantially rectangular first-upper-member region 726 and a substantially circular first-upper-member region 728. In a preferred embodiment, the second-upper-member planar bottom surface 734 further comprises a substantially rectangular second-upper-member region 744 and a substantially circular second-upper-member region 748.

The foregoing explanations, descriptions, illustrations, examples, and discussions have been set forth to assist the reader with understanding this invention and further to demonstrate the utility and novelty of it and are by no means restrictive of the scope of the invention. It is the following claims, including all equivalents, which are intended to define the scope of this invention.

What is claimed is:

1. A workholding apparatus, comprising:
   (a) a base comprising a width, a length, and a height, thereby defining a three-dimensional orthogonal coordinate system having orthogonal x axis, y axis, and z axis, wherein the x axis is disposed substantially along the length and at ½ the width, wherein the y axis is disposed substantially along the width and at ½ the length, and wherein the z axis is disposed substantially along the height and at the intersection of the x axis and the y axis, said base comprising a channel along the x axis;
   (b) a first unitary lower member comprising a first protrusion wherein the first protrusion comprises:
   (i) a first-lower-member planar top surface whose normal vector is substantially parallel to the z axis, said first-lower-member planar top surface comprising a substantially triangular first-lower-member region having two first-lower-member edges oriented substantially symmetrically at an edge angle with respect to the x axis; and
   (ii) two first-lower-member planar side surfaces along the two first-lower-member edges tilted inwardly by a tilt angle with respect to the z axis;

(c) a second unitary lower member comprising a second protrusion wherein the second protrusion comprises:
  (i) a second-lower-member planar top surface whose normal vector is substantially parallel to the z axis, said second-lower-member planar top surface comprising a substantially triangular second-lower-member region having two second-lower-member edges oriented substantially symmetrically at the edge angle with respect to the x axis; and
  (ii) two second-lower-member planar side surfaces along the two second-lower-member edges tilted inwardly by the tilt angle with respect to the z axis;
(d) a first upper member comprising a first cavity wherein the first cavity comprises:
  (i) a first-upper-member planar bottom surface whose normal vector is substantially parallel to the z axis, said first-upper-member planar bottom surface comprising a substantially triangular first-upper-member region having two first-upper-member edges oriented substantially symmetrically at the edge angle with respect to the x axis; and
  (ii) two first-upper-member planar side surfaces along the two first-upper-member edges tilted inwardly by the tilt angle with respect to the z axis;
(e) a second upper member comprising a second cavity wherein the second cavity comprises:
  (i) a second-upper-member planar bottom surface whose normal vector is substantially parallel to the z axis, said second-upper-member planar bottom surface comprising a substantially triangular second-upper-member region having two second-upper-member edges oriented substantially symmetrically at the edge angle with respect to the x axis; and
  (ii) two second-upper-member planar side surfaces along the two second-upper-member edges tilted inwardly by the tilt angle with respect to the z axis; and
(f) an actuator disposed slidably removably within the channel and coupled with the first unitary lower member and the second unitary lower member;
wherein the first upper member releasably engages the first unitary lower member by inserting the first protrusion in the first cavity;
wherein the second upper member releasably engages the second unitary lower member by inserting the second protrusion in the second cavity; and
wherein the actuator is configured to move the second unitary lower member toward the first unitary lower member along the x axis.

2. The apparatus of claim 1, wherein the width is equal to 4.0 inches, the length is equal to 5.9 inches, and the height is equal to 1.9 inches.

3. The apparatus of claim 1, wherein the edge angle is equal to 45 degrees.

4. The apparatus of claim 1, wherein the tilt angle is equal to 30 degrees.

5. The apparatus of claim 1, wherein the first-lower-member planar top surface further comprises a substantially rectangular first-lower-member region and a substantially circular first-lower-member region, and wherein the first-upper-member planar bottom surface further comprises a substantially rectangular first-upper-member region and three substantially circular first-upper-member regions.

6. The apparatus of claim 1, wherein the second-lower-member planar top surface further comprises a substantially rectangular second-lower-member region and a substantially circular second-lower-member region, and wherein the second-upper-member planar bottom surface further comprises a substantially rectangular second-upper-member region and three substantially circular second-upper-member regions.

7. The apparatus of claim 1, wherein the actuator is a bolt having a shank section and a threaded section.

8. The apparatus of claim 7, wherein the first unitary lower member further comprises a clearance hole and the second unitary lower member further comprises a threaded hole, and wherein the bolt is coupled with the first unitary lower member and the second unitary lower member via the clearance hole and the threaded hole, respectively.

9. The apparatus of claim 1, wherein the actuator is a bolt having a clockwise threaded section and a counter-clockwise threaded section.

10. The apparatus of claim 9, wherein the first unitary lower member further comprises a clockwise threaded hole and the second unitary lower member further comprises a counter-clockwise threaded hole, and wherein the bolt is coupled with the first unitary lower member and the second unitary lower member via the clockwise threaded hole and the counter-clockwise threaded hole, respectively.

11. A removable jaw assembly for a workholding apparatus, said workholding apparatus comprising a base comprising a width, a length, and a height, thereby defining a three-dimensional orthogonal coordinate system having orthogonal x axis, y axis, and z axis, wherein the x axis is disposed substantially along the length and at ½ the width, wherein the y axis is disposed substantially along the width and at ½ the length, and wherein the z axis is disposed substantially along the height and at the intersection of the x axis and the y axis, said base comprising a channel along the x axis, said removable jaw assembly comprising:
  (a) a first unitary lower member comprising a first protrusion wherein the first protrusion comprises:
    (i) a first-lower-member planar top surface whose normal vector is substantially parallel to the z axis, said first-lower-member planar top surface comprising a substantially triangular first-lower-member region having two first-lower-member edges oriented substantially symmetrically at an edge angle with respect to the x axis; and
    (ii) two first-lower-member planar side surfaces along the two first-lower-member edges tilted inwardly by a tilt angle with respect to the z axis;
  (b) a second unitary lower member comprising a second protrusion wherein the second protrusion comprises:
    (i) a second-lower-member planar top surface whose normal vector is substantially parallel to the z axis, said second-lower-member planar top surface comprising a substantially triangular second-lower-member region having two second-lower-member edges oriented substantially symmetrically at the edge angle with respect to the x axis; and
    (ii) two second-lower-member planar side surfaces along the two second-lower-member edges tilted inwardly by the tilt angle with respect to the z axis;
  (c) a first upper member comprising a first cavity wherein the first cavity comprises:
    (i) a first-upper-member planar bottom surface whose normal vector is substantially parallel to the z axis, said first-upper-member planar bottom surface comprising a substantially triangular first-upper-member region having two first-upper-member edges oriented substantially symmetrically at the edge angle with respect to the x axis; and
    (ii) two first-upper-member planar side surfaces along the two first-upper-member edges tilted inwardly by the tilt angle with respect to the z axis;

(d) a second upper member comprising a second cavity wherein the second cavity comprises:
  (i) a second-upper-member planar bottom surface whose normal vector is substantially parallel to the z axis, said second-upper-member planar bottom surface comprising a substantially triangular second-upper-member region having two second-upper-member edges oriented substantially symmetrically at the edge angle with respect to the x axis; and
  (ii) two second-upper-member planar side surfaces along the two second-upper-member edges tilted inwardly by the tilt angle with respect to the z axis; and
(e) an actuator disposed slidably removably within the channel and coupled with the first unitary lower member and the second unitary lower member;
wherein the first upper member releasably engages the first unitary lower member by inserting the first protrusion in the first cavity;
wherein the second upper member releasably engages the second unitary lower member by inserting the second protrusion in the second cavity; and
wherein the actuator is configured to move the second lower member toward the first lower member along the x axis.

12. The assembly of claim 11, wherein the width is equal to 4.0 inches, the length is equal to 5.9 inches, and the height is equal to 1.9 inches.

13. The assembly of claim 11, wherein the edge angle is equal to 45 degrees.

14. The assembly of claim 11, wherein the tilt angle is equal to 30 degrees.

15. The assembly of claim 11, wherein the first-lower-member planar top surface further comprises a substantially rectangular first-lower-member region and a substantially circular first-lower-member region, and wherein the first-upper-member planar bottom surface further comprises a substantially rectangular first-upper-member region and three substantially circular first-upper-member regions.

16. The assembly of claim 11, wherein the second-lower-member planar top surface further comprises a substantially rectangular second-lower-member region and a substantially circular second-lower-member region, and wherein the second-upper-member planar bottom surface further comprises a substantially rectangular second-upper-member region and three substantially circular second-upper-member regions.

17. The assembly of claim 11, wherein the actuator is a bolt having a shank section and a threaded section.

18. The assembly of claim 17, wherein the first unitary lower member further comprises a clearance hole and the second unitary lower member further comprises a threaded hole, and wherein the bolt is coupled with the first unitary lower member and the second unitary lower member via the clearance hole and the threaded hole, respectively.

19. The apparatus of claim 11, wherein the actuator is a bolt having a clockwise threaded section and a counter-clockwise threaded section.

20. The apparatus of claim 19, wherein the first unitary lower member further comprises a clockwise threaded hole and the second unitary lower member further comprises a counter-clockwise threaded hole, and wherein the bolt is coupled with the first unitary lower member and the second unitary lower member via the clockwise threaded hole and the counter-clockwise threaded hole, respectively.

21. A mounting apparatus, comprising:
(a) a base comprising a width, a length, and a height, thereby defining a three-dimensional orthogonal coordinate system having orthogonal x axis, y axis, and z axis, wherein the x axis is disposed substantially along the length and at ½ the width, wherein the y axis is disposed substantially along the width and at ½ the length, and wherein the z axis is disposed substantially along the height and at the intersection of the x axis and the y axis, said base comprising a channel along the x axis;
(b) a first unitary lower member comprising a first protrusion wherein the first protrusion comprises:
  (i) a first-lower-member planar top surface whose normal vector is substantially parallel to the z axis, said first-lower-member planar top surface comprising a substantially triangular first-lower-member region having two first-lower-member edges oriented substantially symmetrically at an edge angle with respect to the x axis; and
  (ii) two first-lower-member planar side surfaces along the two first-lower-member edges tilted inwardly by a tilt angle with respect to the z axis;
(c) a second unitary lower member comprising a second protrusion wherein the second protrusion comprises:
  (i) a second-lower-member planar top surface whose normal vector is substantially parallel to the z axis, said second-lower-member planar top surface comprising a substantially triangular second-lower-member region having two second-lower-member edges oriented substantially symmetrically at the edge angle with respect to the x axis; and
  (ii) two second-lower-member planar side surfaces along the two second-lower-member edges tilted inwardly by the tilt angle with respect to the z axis;
(d) an upper member comprising a first distal-end cavity and a second distal-end cavity;
wherein the first distal-end cavity comprises:
a first-upper-member planar bottom surface whose normal vector is substantially parallel to the z axis, said first-upper-member planar bottom surface comprising a substantially triangular first-upper-member region having two first-upper-member edges oriented substantially symmetrically at the edge angle with respect to the x axis; and
  (ii) two first-upper-member planar side surfaces along the two first-upper-member edges tilted inwardly by the tilt angle with respect to the z axis:
wherein the second distal-end cavity comprises:
  (i) a second-upper-member planar bottom surface whose normal vector is substantially parallel to the z axis, said second-upper-member planar bottom surface comprising a substantially triangular second-upper-member region having two second-upper-member edges oriented substantially symmetrically at the edge angle with respect to the x axis; and
  (ii) two second-upper-member planar side surfaces along the two second-upper-member edges tilted inwardly by the tilt angle with respect to the z axis; and
(e) an actuator disposed slidably removably within the channel and coupled with the first unitary lower member and the second unitary lower member;
wherein the upper member releasably engages the first unitary lower member by inserting the first protrusion in the first distal-end cavity;
wherein the upper member releasably engages the second unitary lower member by inserting the second protrusion in the second distal-end cavity; and
wherein the actuator is configured to move the second unitary lower member toward the first unitary lower member along the x axis.

22. The apparatus of claim 21, wherein the edge angle is equal to 45 degrees.

23. The apparatus of claim 21, wherein the tilt angle is equal to 30 degrees.

24. The apparatus of claim 21, wherein the first-lower-member planar top surface further comprises a substantially rectangular first-lower-member region and a substantially circular first-lower-member region, and wherein the first-upper-member planar bottom surface further comprises a substantially rectangular first-upper-member region and a substantially circular first-upper-member regions.

25. The apparatus of claim 21, wherein the second-lower-member planar top surface further comprises a substantially rectangular second-lower-member region and a substantially circular second-lower-member region, and wherein the second-upper-member planar bottom surface further comprises a substantially rectangular second-upper-member region and a substantially circular second-upper-member regions.

26. A mounting apparatus, comprising:
(a) a base comprising a width, a length, and a height, thereby defining a three-dimensional orthogonal coordinate system having orthogonal x axis, y axis, and z axis, wherein the x axis is disposed substantially along the length and at ½ the width, wherein the y axis is disposed substantially along the width and at ½ the length, and wherein the z axis is disposed substantially along the height and at the intersection of the x axis and the y axis, said base comprising a channel and a plurality of threaded index holes along the x axis;
(b) a first unitary lower member, coupled with the base via two of the plurality of threaded index holes, said first unitary lower member comprising a first protrusion wherein the first protrusion comprises:
(i) a first-lower-member planar top surface whose normal vector is substantially parallel to the z axis, said first-lower-member planar top surface comprising a substantially triangular first-lower-member region having two first-lower-member edges oriented substantially symmetrically at an edge angle with respect to the x axis; and
(ii) two first-lower-member planar side surfaces along the two first-lower-member edges tilted inwardly by a tilt angle with respect to the z axis;
(c) a second unitary lower member, coupled with the base via another two of the plurality of threaded index holes, said second unitary lower member comprising a second protrusion wherein the second protrusion comprises:
(i) a second-lower-member planar top surface whose normal vector is substantially parallel to the z axis, said second-lower-member planar top surface comprising a substantially triangular second-lower-member region having two second-lower-member edges oriented substantially symmetrically at the edge angle with respect to the x axis; and
(ii) two second-lower-member planar side surfaces along the two second-lower-member edges tilted inwardly by the tilt angle with respect to the z axis; and
(d) an upper member comprising a first distal-end cavity and a second distal-end cavity;
wherein the first distal-end cavity comprises:
(i) a first-upper-member planar bottom surface whose normal vector is substantially parallel to the z axis, said first-upper-member planar bottom surface comprising a substantially triangular first-upper-member region having two first-upper-member edges oriented substantially symmetrically at the edge angle with respect to the x axis; and
(ii) two first-upper-member planar side surfaces along the two first-upper-member edges tilted inwardly by the tilt angle with respect to the z axis;
wherein the second distal-end cavity comprises:
(i) a second-upper-member planar bottom surface whose normal vector is substantially parallel to the z axis, said second-upper-member planar bottom surface comprising a substantially triangular second-upper-member region having two second-upper-member edges oriented substantially symmetrically at the edge angle with respect to the x axis; and
(ii) two second-upper-member planar side surfaces along the two second-upper-member edges tilted inwardly by the tilt angle with respect to the z axis;
wherein the upper member releasably engages the first unitary lower member by inserting the first protrusion in the first distal-end cavity; and
wherein the upper member releasably engages the second unitary lower member by inserting the second protrusion in the second distal-end cavity.

27. The apparatus of claim 26, wherein the edge angle is equal to 45 degrees.

28. The apparatus of claim 26, wherein the tilt angle is equal to 30 degrees.

29. The apparatus of claim 26, wherein the first-lower-member planar top surface further comprises a substantially rectangular first-lower-member region and a substantially circular first-lower-member region, and wherein the first-upper-member planar bottom surface further comprises a substantially rectangular first-upper-member region and a substantially circular first-upper-member regions.

30. The apparatus of claim 26, wherein the second-lower-member planar top surface further comprises a substantially rectangular second-lower-member region and a substantially circular second-lower-member region, and wherein the second-upper-member planar bottom surface further comprises a substantially rectangular second-upper-member region and a substantially circular second-upper-member regions.

* * * * *